(12) United States Patent
Nagaraj et al.

(10) Patent No.: US 9,591,361 B2
(45) Date of Patent: Mar. 7, 2017

(54) STREAMING OF MULTIMEDIA DATA FROM MULTIPLE SOURCES

(75) Inventors: Thadi M. Nagaraj, San Diego, CA (US); Joseph P. Barone, San Diego, CA (US); Rajesh Narayanan, Poway, CA (US); Giridhar Kapalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 13/561,068

(22) Filed: Jul. 29, 2012

(65) Prior Publication Data

US 2013/0060911 A1 Mar. 7, 2013

Related U.S. Application Data

(60) Provisional application No. 61/531,879, filed on Sep. 7, 2011.

(51) Int. Cl.
*G06F 15/16* (2006.01)
*H04N 21/462* (2011.01)
(Continued)

(52) U.S. Cl.
CPC ......... *H04N 21/4622* (2013.01); *H04L 65/00* (2013.01); *H04L 65/4084* (2013.01);
(Continued)

(58) Field of Classification Search
CPC ......... H04N 21/4825; H04N 21/23439; H04N 21/44209; H04N 21/8455; H04N 21/8456;
(Continued)

(56) References Cited

U.S. PATENT DOCUMENTS 6,594,699 B1 7/2003 Sahai et al.
6,598,075 B1 7/2003 Ogdon et al.
(Continued)

FOREIGN PATENT DOCUMENTS

EP 2362651 A1 8/2011
JP 2004266503 A 9/2004
(Continued)

OTHER PUBLICATIONS

Universal Mobile Telecommunications System (UMTS); LTE; ETSI TS 126 247 v10.0.0 (Jun. 2011) Transparent end-to-end Packet-switched Streaming Service (PSS); Progressive Download and Dynamic Adaptive Streaming over HTTP (3GP-DASH) (3GPP TS 26.247 version 10.0.0 Release 10).*
(Continued)

*Primary Examiner* — Djenane Bayard

(57) ABSTRACT

In one example, a device includes a plurality of interfaces, wherein each of the interfaces is communicatively coupled to a respective one of a plurality of sources, a stream management unit configured to select, using a manifest file for multimedia content, one of a plurality of representations from which to retrieve multimedia data of the multimedia content, wherein the manifest file includes information indicative of the plurality of representations of the multimedia content, wherein the plurality of representations includes the selected representation, wherein multimedia data for the representations is available from the plurality of sources, and wherein the stream management unit is configured to select one of the sources from which to retrieve multimedia data for the selected representation, and a source component configured to retrieve multimedia data for the selected representation from the selected source via the one of the interfaces that is communicatively coupled to the selected source.

25 Claims, 11 Drawing Sheets

(51) Int. Cl.
*H04N 21/2343* (2011.01)
*H04N 21/442* (2011.01)
*H04L 29/06* (2006.01)

(52) U.S. Cl.
CPC ....... *H04L 65/80* (2013.01); *H04N 21/23439* (2013.01); *H04N 21/234327* (2013.01); *H04N 21/44209* (2013.01)

(58) Field of Classification Search
CPC ............ H04N 21/2365; H04N 21/6175; H04L 65/4076; H04L 65/4084; H04L 67/18; H04L 65/4069; H04L 12/1818; H04L 2012/2849
See application file for complete search history.

(56) References Cited

U.S. PATENT DOCUMENTS

| | | | |
|---|---|---|---|
| 7,010,492 | B1 | 3/2006 | Bassett et al. |
| 2007/0186003 | A1 | 8/2007 | Foster et al. |
| 2010/0011117 | A1* | 1/2010 | Hristodorescu et al. ..... 709/231 |
| 2010/0205271 | A1* | 8/2010 | Callaghan ..................... 709/206 |
| 2010/0235472 | A1 | 9/2010 | Sood et al. |
| 2012/0124179 | A1* | 5/2012 | Cappio et al. ................. 709/219 |
| 2012/0259994 | A1* | 10/2012 | Gillies ................ H04L 12/1881 709/231 |
| 2012/0290644 | A1* | 11/2012 | Gabin et al. ................... 709/203 |
| 2012/0317305 | A1* | 12/2012 | Einarsson et al. ............ 709/231 |
| 2013/0294747 | A1 | 11/2013 | Takahashi |
| 2014/0164575 | A1* | 6/2014 | Wang et al. ................... 709/219 |
| 2014/0325030 | A1* | 10/2014 | Maharajh .......... G06F 17/30035 709/219 |
| 2014/0351385 | A1* | 11/2014 | Li ........................ H04L 65/601 709/219 |
| 2016/0006817 | A1* | 1/2016 | Mitic .................. H04L 65/4076 709/232 |

FOREIGN PATENT DOCUMENTS

| | | |
|---|---|---|
| JP | 2005136762 A | 5/2005 |
| JP | 2010212942 A | 9/2010 |
| KR | 20090091722 A | 8/2009 |
| WO | WO-2011038032 A2 | 3/2011 |
| WO | 2011087449 A1 | 7/2011 |
| WO | WO-2012096372 A1 | 7/2012 |

OTHER PUBLICATIONS

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pages.
ETSI TS 126 247, v10.0.0 (Jun. 2011), 3rd Generation Partnership Project; Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 10.0.0 Release 10), 96 pages.
Fielding, et al., "Hypertext Transfer Protocol—HTTP/1.1", pp. 1-6, 30-34, 152-154 (Jan. 1997).
Fielding et al., "RFC 2616: Hypertext Transfer Protocol HTTP/1.1", Internet Citation, Jun. 1999 (Jun. 1999), pp. 165, XP002196143, Retrieved from the Internet: URL:http://www.rfc-editororg/ [retrieved on Apr. 15, 2002].
International Search Report and Written Opinion—PCT/US2012/053377—ISA/EPO—Nov. 2, 2012.
International Standard ISO/IEC 14496-12, Information Technology—Coding of audio-visual objects—Part 12: ISO base media file format, Third Edition, Oct. 15, 2008, 120 pages.
ISO/IEC JTC 1/SC 29; ISO/IEC FCD 23001-06, "Information Technology—MPEG Systems Technologies—Part 6: Dynamic Adaptive Streaming Over HTTP (DASH)," Jan. 28, 2011, 86 pages.
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Paila et al., "FLUTE—File Delivery over Unidirectional Transport", Network Working Group, RFC 3926, Oct. 1, 2004, The Internet Society, XP015009699, ISSN: 0000-0003.
Qualcomm Incorporated: "Use cases for Rel-10 Adaptive HTTP Streaming", 3GPP Draft; S4-100580 Permanentdocumentusecases-HSD, 3RD Generation Partnership Project (3GPP), Mobile Competence Centre ; 650, Route Des Lucioles ; F-06921 Sophia-Antipolis Cedex ; France, vol. SA WG4, No. Erlangen, Germany; Aug. 16, 2010-Aug. 20, 2010, Aug. 11, 2010 (Aug. 11, 2010), XP050638785, [retrieved on Aug. 11, 2010].
Stockhammer, "WE 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
"Universal Mobile Telecommunications System (UMTS); LTE; Transparent end-to-end Packet-switched Streaming Service (PSS); Protocols and codecs (3GPP TS 26.234 version 9.2.0 Release 9)", Technical Specification, European Telecommunications Standards Institute (ETSI), 650, Route Des Lucioles ; F-06921 Sophiaantipolis ; France, vol . 3GPP SA 4, No. V9.2.0, Apr. 1, 2010 (Apr. 1, 2010), XP014046628, section 12.2.2 section 12.2.3 section 12.6.2 section Q.2.2.1.
Wenger, et al., RFC 3984, "RTP Payload Format for H.264 Video," Feb. 2005, 84 pp.
Watson M, "DASH V1.1: Selection Groups", 97. MPEG Meeting; Jul. 18, 2011-Jul. 22, 2011; Torino; (Motion Picture Expert Group or ISO/IEC JTC1/SC29/WG11) No. m20385, Jun. 17, 2011 (Jun. 17, 2011), XP030048949, pp. 1-4.

* cited by examiner

STREAMING OF MULTIMEDIA DATA FROM MULTIPLE SOURCES

This application claims the benefit of U.S. Provisional Application No. 61/531,879, filed Sep. 7, 2011, which is hereby incorporated by reference in its entirety.

TECHNICAL FIELD

This disclosure relates to transport of encoded multimedia data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported or stored in a variety of ways, such as transmission over a computer network using network streaming or stored on local data storage media such as a DVD or Blu-Ray disk.

SUMMARY

In general, this disclosure describes techniques for improving streaming of media data. This disclosure provides techniques for extending streaming of media data to sources in addition to sources that provide network streaming using hypertext transfer protocol (HTTP). For example, media data may be transported in accordance with dynamic adaptive streaming over HTTP (DASH), but from sources in addition or in the alternative to HTTP servers, such as broadcast network transmission sources, over the air broadcast sources, and local storage media. While the media data and associated data structures may generally conform to the specifications of DASH, the media data may in fact be retrieved from sources other than network servers implementing HTTP.

In one example, a method of retrieving video data includes selecting, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, and wherein multimedia data for the representations is available from a plurality of sources, selecting one of the sources from which to retrieve multimedia data for the selected representation, and retrieving at least a portion of the multimedia data for the selected representation from the selected source.

In another example, a device includes a plurality of interfaces, wherein each of the interfaces is communicatively coupled to a respective one of a plurality of sources, a stream management unit configured to select, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, wherein multimedia data for the representations is available from the plurality of sources, and wherein the stream management unit is configured to select one of the sources from which to retrieve multimedia data for the selected representation, and a source component configured to retrieve multimedia data for the selected representation from the selected source via the one of the interfaces that is communicatively coupled to the selected source.

In another example, a device for retrieving multimedia data includes means for selecting, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, and wherein multimedia data for the representations is available from a plurality of sources, means for selecting one of the sources from which to retrieve multimedia data for the selected representation, and means for retrieving at least a portion of the multimedia data for the selected representation from the selected source.

In another example, a computer program product includes a computer-readable storage medium having stored thereon instructions that, when executed, cause a processor to select, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, and wherein multimedia data for the representations is available from a plurality of sources, select one of the sources from which to retrieve multimedia data for the selected representation, and retrieve at least a portion of the multimedia data for the selected representation from the selected source.

The details of one or more examples are set forth in the accompanying drawings and the description below. Other features, objects, and advantages will be apparent from the description and drawings, and from the claims.

DETAILED DESCRIPTION

Figure 1:
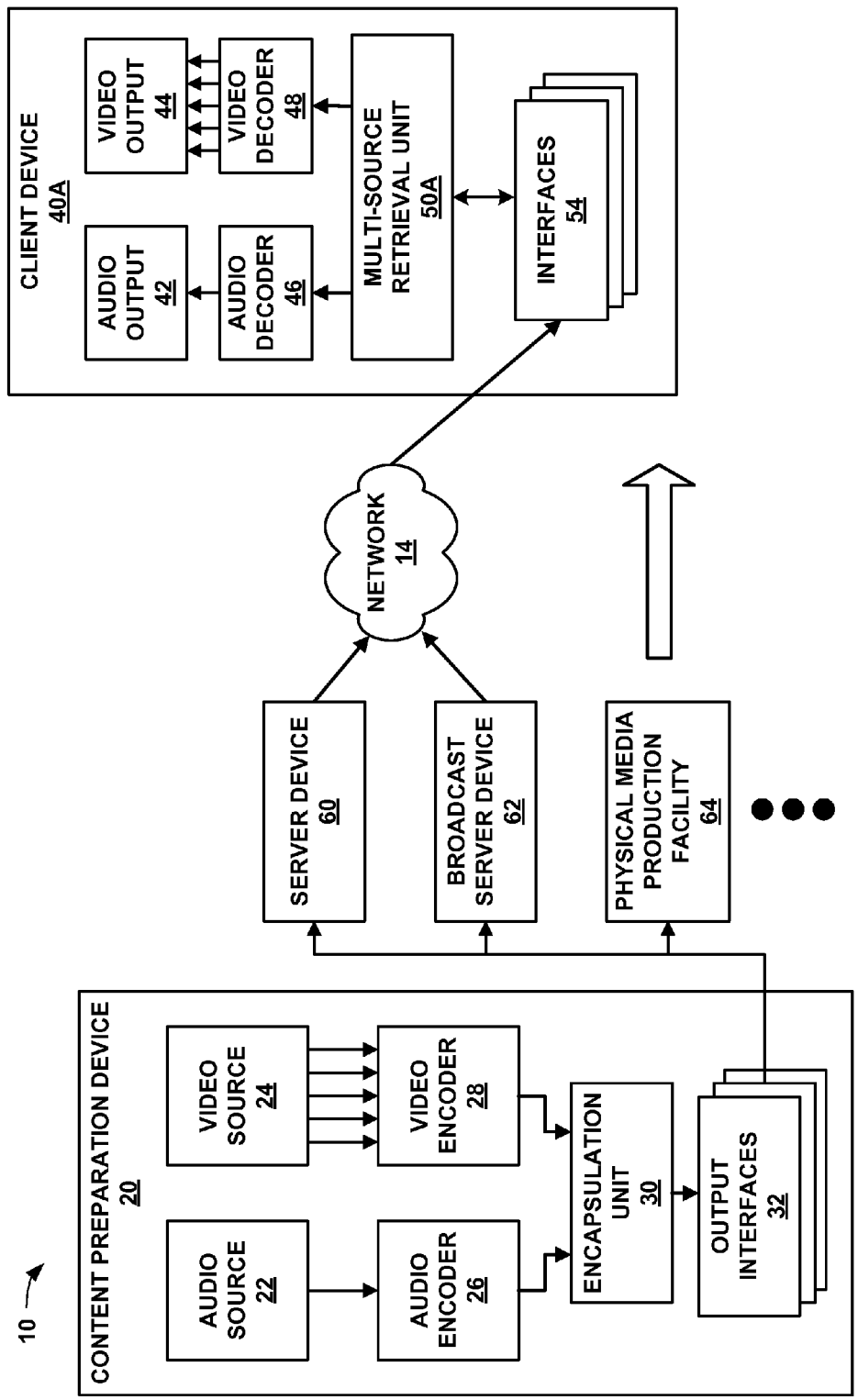
FIG. 1 is a block diagram illustrating an example system that implements techniques for streaming media data from various sources.

In general, this disclosure describes techniques for transporting multimedia data, such as audio and video data. The techniques of this disclosure may be used in conjunction with dynamic adaptive streaming over HTTP (DASH). This disclosure describes various techniques that may be performed in conjunction with network streaming. As described in greater detail below, various devices performing network streaming may be configured to implement the techniques of this disclosure.

In accordance with DASH and similar techniques for streaming multimedia data, multimedia content (such as a movie or other audio/video content, which may also include text overlays or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bitrates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form a representation group, in that representations in the set can be used for bandwidth adaptation. That is, representations in the set may differ in bitrate, but otherwise share substantially the same characteristics. In this manner, a client device may determine various sets of common characteristics for representation groups of multimedia content, and select a representation group based on coding and rendering capabilities of the client device. Then, the client device may adaptively switch between representations in the selected representation group based on bandwidth availability.

In accordance with the techniques of this disclosure, the content preparation device may provide data for the multimedia content to devices other than HTTP server devices. For example, the content preparation device may provide data for the multimedia content to a broadcast network server device, a device or system for producing physical computer-readable storage media, such as DVDs, Blu-Ray discs, and flash drives, or other devices. Ultimately, a receiving device, such as a router of a content delivery network or a client device, may retrieve data from any of the sources using the techniques this disclosure.

The receiving device may retrieve data from one or more of the available sources. For example, the receiving device may determine which of the sources is available for providing a particular representation, and select the source that can provide the representation most efficiently. In this manner, multiple sources of different types may provide redundancy to each other, such that if one of the sources is not available, a receiving device may still have access to multimedia content from a different source.

Alternatively, the receiving device may retrieve data from two or more sources substantially simultaneously or in sequence, e.g., to augment the data retrieved from one source with the data retrieved by another source. For example, a DVD may specify that, prior to display of a featured presentation, advertisements or previews are to be presented. Rather than storing data for the advertisements or previews to the DVD itself, the DVD may include information for retrieving the data for the advertisements or previews from an external source, such as an HTTP server device or broadcast server device. In this manner, the advertisements or previews may remain relatively current, regardless of when the DVD is played. Similar techniques may be used to add or alter advertisements of a broadcast network transmission. For example, primary multimedia content may be transported using a broadcast network transmission, while advertisements may be retrieved from an HTTP server device. A client device may be instructed to retrieve advertisements that are targeted to a user of the client device, e.g., based on demographic information for the user and/or Internet browsing behavior of the user when the user sets permissions that allow sharing of demographic information and/or Internet browsing behavior with an external device.

As another example, a DVD may include a representation having a particular rating. The rating may describe content suitability for a particular audience. For example, in the United States, the Motion Picture Association of America defines ratings including G, PG, PG-13, R, and NC-17. As another example, in the United Kingdom, the British Board of Film Classification defines ratings including U, PG, 12A, 12, 15, 18, and R18. As yet another example, in the Republic of China (Taiwan), categories of motion pictures include a general audiences category, a protected category, a parental guidance category, and a restricted category. In some cases, the rating of the DVD may be determined to be inappropriate or not desired for a current audience. However, the content of the DVD may be augmented using, e.g., data retrieved using HTTP streaming or broadcast network transmission to modify the content of the DVD such that the modified content is acceptable for the current audience. Similar techniques may be used to modify the rating of multimedia content of a broadcast network transmission.

As yet another example, a DVD may include a representation having two-dimensional video content. A user may desire three-dimensional video playback. Rather than purchasing a second DVD, the user may indicate a desire to view three-dimensional video. Using the techniques of this disclosure, a second view that can form a stereo view pair with a view of the video data included on the DVD may be retrieved and played substantially simultaneously with the data of the DVD to produce three-dimensional video playback. Similar techniques may be used to provide three-dimensional video for a broadcast network transmission of a representation of multimedia content. For example, a second view forming a stereo view pair may be retrieved using HTTP streaming or from a second broadcast.

As still another example, a locally stored version of data may have a particular quality level. For example, the locally stored version of data may correspond to a base layer of scalable video coding (SVC) data. A client device storing the data may comprise a mobile device with relatively limited storage capacity. Thus, rather than storing a full, high-quality representation of multimedia content, the client device may simply store a copy of the base layer. When a network connection is available, the client device may request one or more enhancement layers corresponding to the base layer. However, when the network connection is not available, the client device may simply display data corresponding to the base layer.

As a further example, a broadcast server device may broadcast data for a representation of multimedia content having random access points (RAPs) having a particular frequency in the representation. However, rather than immediately retrieving data of the representation being broadcast, a client device may initially begin retrieving data of a different representation of the multimedia content from a server device using HTTP requests, where the different representation may have relatively more frequent RAPs. After buffering a sufficient amount of data from the different representation, the client device may switch to the representation being broadcast by the broadcast server device.

Moreover, the techniques of this disclosure may be used to augment other elements of multimedia content as well. For example, a client device may be configured to retrieve, decode, and display video data from, e.g., a broadcast network transmission or a DVD. The client device may retrieve audio data from a different source, e.g., when the broadcast network transmission does not include audio data in a language desired by a user of the client device. As another example, a client device may be configured to retrieve textual overlays, such as closed captioning, from a different source, e.g., when closed caption text is not provided in the representation data of the broadcast network transmission, or when a desired language of closed caption text is not available within the broadcast network transmission.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The ISO Base Media File format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or other identifier, e.g., URI. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Multimedia content may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by various characteristics, such as encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group, which may be indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL or URI.

Each representation may also include one or more media components, where each media component may correspond to an encoded version of one individual media type, such as audio, video, and/or timed text (e.g., for closed captioning). Media components may be time-continuous across boundaries of consecutive media segments within one representation.

FIG. 1 is a block diagram illustrating an example system 10 that implements techniques for streaming media data from various different sources. In this example, system 10 includes content preparation device 20, server device 60, broadcast server device 62, physical media production facility 64, network 14, and client device 40A. Client device 40A and server device 60 are communicatively coupled by network 14, which may comprise the Internet. In some examples, content preparation device 20, server device 60, broadcast server device 62, and physical media production facility 64 may also be coupled by network 14 or another network, or may be directly communicatively coupled. In some examples, any or all of content preparation device 20, server device 60, broadcast server device 62, and physical media production facility 64 may comprise the same device or facility. Moreover, content preparation device 20 is not necessarily communicatively coupled to server device 60, broadcast server device 62, and/or physical media production facility 64 in all examples, but may store multimedia content to a separate medium that is read by any or all of server device 60, broadcast server device 62, and/or physical media production facility 64.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized as Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the nonnative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interfaces 32. Output interfaces 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interfaces 32, which may send the data to server device 60, broadcast server device 62, and/or physical media production facility 64 via network transmission or storage media.

The MPD may refer to an external location, e.g., a network location hosted by server device 60, of an MPD update, an MPD extension, or an external period, e.g., for additional or alternative multimedia data. For example, multimedia data stored on physical media produced by physical media production facility 64, transmitted by broadcast server device 62, provided by server device 60, or provided by another source may correspond to primary multimedia data. An external period may correspond to data of an alternative source that may be used to enhance, modify, replace, or otherwise augment the primary multimedia data. As explained in greater detail below, the external period may include advertisement multimedia data or other additional multimedia data, replacement multimedia data for, e.g., adapting a rating of the stored multimedia data or to provide other alternative content (e.g., an alternate ending or a director's cut).

The external period may additionally or alternatively provide extensions or enhancements to the primary multimedia data. For example, in the context of scalable video coding (SVC), the primary multimedia data may correspond to a base layer of SVC, and the external period may include data for an enhancement layer corresponding to the base layer. As another example, in the context of multiview video coding (MVC), the primary multimedia data may include one or more views, and the external period may include data for one or more additional views. Alternatively, the primary multimedia data may include data for at least one view, and the external period may include data for a depth map corresponding to the view of the primary multimedia data.

In this manner, content preparation device 20 may prepare multimedia content conforming to DASH, and provide data for representations of the multimedia content to server device 60, broadcast server device 62, and physical media production facility 64, among other sources that may transport or otherwise output the data. Accordingly, as explained in greater detail below, the data output by sources other than HTTP servers (e.g., server device 60) may conform to DASH. Although the techniques of DASH are generally performed by devices implementing HTTP, this disclosure provides techniques for providing sources other than HTTP servers from which a client device, such as client device 40A, may retrieve multimedia data conforming to DASH.

In the example of FIG. 1, server device 60 may implement HTTP/1.1 for receiving HTTP Get and partial Get requests from client devices, such as client device 40A, and providing requested data to the requesting client device. In this manner, server device 60 may provide a unicast service to one or more client devices, such as client device 40A. To retrieve data from server device 60, client device 40A may issue an HTTP Get or partial Get request to server device 60. Interfaces 54 may include a network interface card (NIC) that implements an HTTP stack for communicating with server device 60. NICs of interfaces 54 may include wired NICs, wireless NICs implementing wireless protocols such as one or more IEEE 802.11 protocols, and/or a cellular packet radio interface.

Broadcast server device 62 may send packets to one or more client devices, such as client device 40A, in order to broadcast media data. For example, broadcast server device 62 may implement Evolved Multimedia Broadcast Multicast Service (eMBMS) for delivering multimedia data to one or more client devices, such as client device 40A, using either broadcast or multicast. In this manner, client device 40A may receive multimedia data conforming to DASH using eMBMS. Alternatively, broadcast server device 62 may implement Internet protocol (IP) multicast to send multimedia data to one or more client devices, such as client device 40A. In this manner, broadcast server device 62 represents an example of a source, other than an HTTP server, from which multimedia data conforming to DASH may be retrieved. To retrieve multicast data from broadcast server device 62, client device 40A may determine a multicast group address associated with the multicast and join the IP multicast group address, e.g., in accordance with Internet Group Management Protocol (IGMP). Interfaces 54 may include a network interface card (NIC) that implements eMBMS, and/or a NIC that implements an IP stack for joining an IP multicast group associated with broadcast server device 62.

Physical media production facility 64 may produce physical media, such as DVDs, Blu-ray discs, flash drives, or other physical media for storing multimedia data. The storage media may be shipped and ultimate arrive at a physical location of client device 40A. As discussed above, the multimedia data that physical media production facility 64 stores to the physical media may be formatted according to DASH. For example, the physical media may include a media presentation description (MPD) or other manifest file. In this manner, the physical media produced by physical media production facility 64 represents an example of a source, other than an HTTP server, from which multimedia data conforming to DASH may be retrieved. A user of client device 40A may couple the physical media to client device 40A, e.g., by inserting a disc into a corresponding optical reader or connecting a flash drive to a universal serial bus (USB) port, either or both of which may be included within interfaces 54 of client device 40A.

In the example of FIG. 1, client device 40A includes multi-source retrieval unit 50A and interfaces 54. As discussed above, interfaces 54 may be configured to retrieve multimedia data from any or all of server device 60, broadcast server device 62, a physical storage medium produced by physical media production facility 64, or other sources. For example, interfaces 54 may additionally or alternatively include a tuner card for receiving over-the-air television broadcast signals.

Multi-source retrieval unit 50A may generally be configured to determine one or more sources from which to retrieve multimedia data, as well as to select one or more representations of multimedia content. For example, multi-source retrieval unit 50A may retrieve configuration data (not shown) of client device 40A to determine decoding capabilities of video decoder 48 and rendering capabilities of video output 44. The configuration data may also include any or all of a language preference selected by a user of client device 40A, one or more camera perspectives corresponding to depth preferences set by the user of client device 40A, and/or a rating preference selected by the user of client device 40A. Multi-source retrieval unit 50A may correspond to software instructions executed by one or more processors or processing units (not shown) of client device 40A. In some examples, all or portions of the functionality described with respect to multi-source retrieval unit 50A may be implemented in hardware, or a combination of hardware, software, and/or firmware, where requisite hardware may be provided to execute instructions for software or firmware.

Multi-source retrieval unit 50A may compare the decoding and rendering capabilities of client device 40A to characteristics of representations of multimedia content indicated by information of a manifest file (such as a media presentation description (MPD) file) for the multimedia content. Multi-source retrieval unit 50A may initially retrieve the manifest file to determine characteristics of representations of the multimedia content. For example, multi-source retrieval unit 50A may request the manifest file, which may describe characteristics of one or more adaptation sets. The manifest file may additionally describe sources from which data for the multimedia content is available. Alternatively, a separate data structure may provide indications of sources from which the data for the multimedia content is available.

Multi-source retrieval unit 50A may select a subset of the representations of the multimedia content (e.g., an adaptation set) having characteristics that can be satisfied by the coding and rendering capabilities of client device 40A. Multi-source retrieval unit 50A may then determine bitrates for representations in the adaptation set, determine a currently available amount of network bandwidth for retrieving data using HTTP streaming, and retrieve segments from one of the representations having a bitrate that can be satisfied by the network bandwidth. Alternatively, multi-source retrieval unit 50A may determine whether to retrieve data for the multimedia content from broadcast server device 62 or a local storage, e.g., a flash drive, DVD, or Blu-ray disc produced by physical media production facility 64.

Multi-source retrieval unit 50A may communicate with interfaces 54 to determine whether communication with certain sources, such as server device 60 and broadcast server device 62, is available. Likewise, multi-source retrieval unit 50A may be configured to determine sources from which particular representations are available. In accordance with the techniques of this disclosure, multi-source retrieval unit 50A may be configured to retrieve data from one or more representations of multimedia content from one or more sources, where the sources may provide data to client device 40A in different ways, e.g., using different techniques or different protocols from each other.

Multi-source retrieval unit 50A may further use these techniques to adapt retrieval of data via network 14 in response to fluctuating availability of network bandwidth. In general, higher bitrate representations may yield higher quality video playback, while lower bitrate representations may provide sufficient quality video playback when available network bandwidth decreases. Accordingly, when available network bandwidth is relatively high, multi-source retrieval unit 50A may retrieve data from relatively high bitrate representations, whereas when available network bandwidth is low, multi-source retrieval unit 50A may retrieve data from relatively low bitrate representations. Moreover, in accordance with the techniques of this disclosure, multi-source retrieval unit 50A may adaptively switch between retrieving data for multimedia content from various sources, such as between server device 60 and broadcast server device 62 based on bandwidth availability of network 14. In this manner, client device 40A may stream multimedia data over network 14 while also adapting to changing network bandwidth availability of network 14.

In some examples, multi-source retrieval unit 50A may determine that a portion of a manifest file, such as the MPD file for multimedia content, is to be updated. Multi-source retrieval unit 50A may be configured to analyze a particular portion of each segment, such as a header portion or other initial portion of the segment, to determine whether the segment indicates that the manifest file is to be updated. When the manifest file is to be updated, multi-source retrieval unit 50A may update a locally stored copy of the manifest file, either using data of the segment or by retrieving data to update the manifest file from a remote location, e.g., from server 60. After updating the manifest file, multi-source retrieval unit 50A may submit future requests for data of representations based on data of the updated manifest file.

As an example, content preparation device 20 may encode live media data, such as a live sporting event, political event, or other newsworthy event that is typically broadcast live or nearly live, rather than pre-recorded. In such cases, segments corresponding to media data up to a particular time may be assigned identifiers, such as URLs, included in an initial manifest file. However, after a period of time has elapsed, segments following the particular time may be encoded and assigned identifiers such as URLs. Encapsulation unit 30 of content preparation device 20 may provide the URLs for the segments following the particular time to an updated manifest file. Accordingly, to determine how to retrieve the segments following the particular time, client device 40 may receive information indicative of the updated manifest file, in order to construct requests to retrieve the segments following the particular time. Similarly, content preparation device 20 may provide data indicating that data for the multimedia content is available from other sources, e.g., broadcast source device 62.

Interfaces 54 may receive and provide data of segments of a selected representation to multi-source retrieval unit 50A. Multi-source retrieval unit 50A may include a decapsulation to decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44. Video decoder 48, audio decoder 46, audio output 42, and video output 44 may be referred to collectively as a multimedia framework, and may be generally responsible for implementing multimedia decoding and rendering of audio and video data.

Video encoder 28, video decoder 48, audio encoder 26, audio decoder 46, encapsulation unit 30, and multi-source retrieval unit 50A each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, and/or multi-source retrieval unit 50 may comprise an integrated circuit, a microprocessor, and/or a wireless communication device, such as a cellular telephone.

Figure 2:
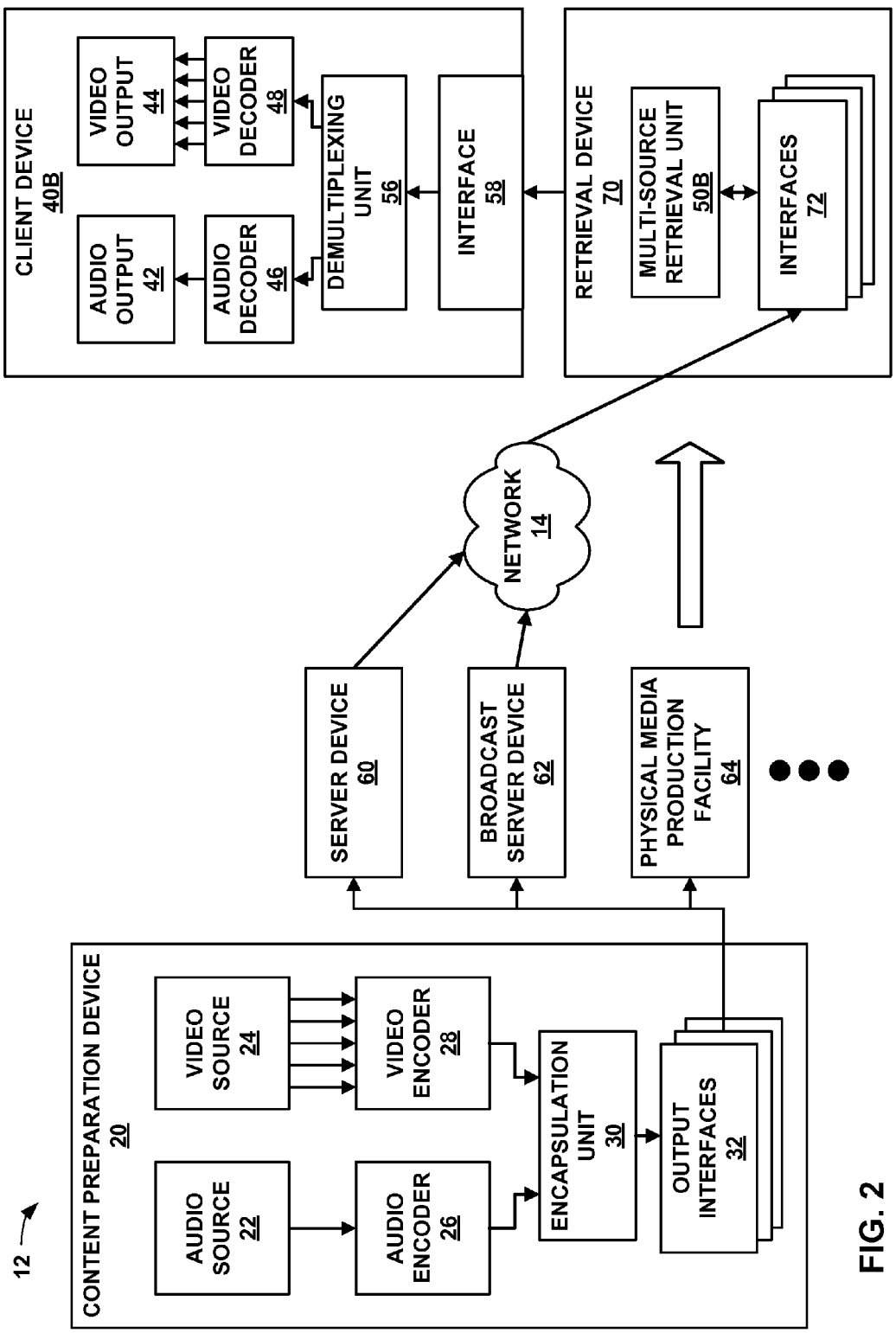
FIG. 2 is a block diagram illustrating another example system that implements techniques for streaming media data from various sources.

FIG. 2 is a block diagram illustrating another example system 12 that implements techniques for streaming media data from various different sources. In this example, system 12 includes content preparation device 20, server device 60, broadcast server device 62, and physical media production facility 64, which conform substantially to the like-numbered elements of FIG. 1. System 12 also includes client device 40B and retrieval device 70.

Client device 40B conforms substantially to client device 40A of FIG. 1, except that client device 40B includes interface 58 and demultiplexing unit 56. Rather than including a multi-source retrieval unit, client device 40B interacts with retrieval device 70, which is configured to retrieve multimedia data from one or more various sources. In the example of FIG. 2, retrieval device 70 includes multi-source retrieval unit 50B, which conforms substantially to multi-source retrieval unit 50A of FIG. 1. Retrieval device 70 also includes interfaces 72, which conform substantially to interfaces 54 of FIG. 1.

In this example, retrieval device 70 retrieves multimedia data in a manner similar to that described with respect to client device 50A of FIG. 1. However, retrieval device 70 provides the retrieved, encoded multimedia data, prior to demultiplexing, to client device 40B in the example of FIG. 2. Retrieval device 70 may comprise, for example, a routing device of a content delivery network. Interface 58 of client device 40B may receive the encoded multimedia data from retrieval device 70 and pass the data to decapsulation unit 56. Alternatively, multi-source retrieval unit 50B may demultiplex the data and pass individual streams of encoded multimedia data (e.g., audio and video data) to client device 40B via interface 58, in which case interface 58 may provide the data directly to audio decoder 46 and video decoder 48.

Figure 3:
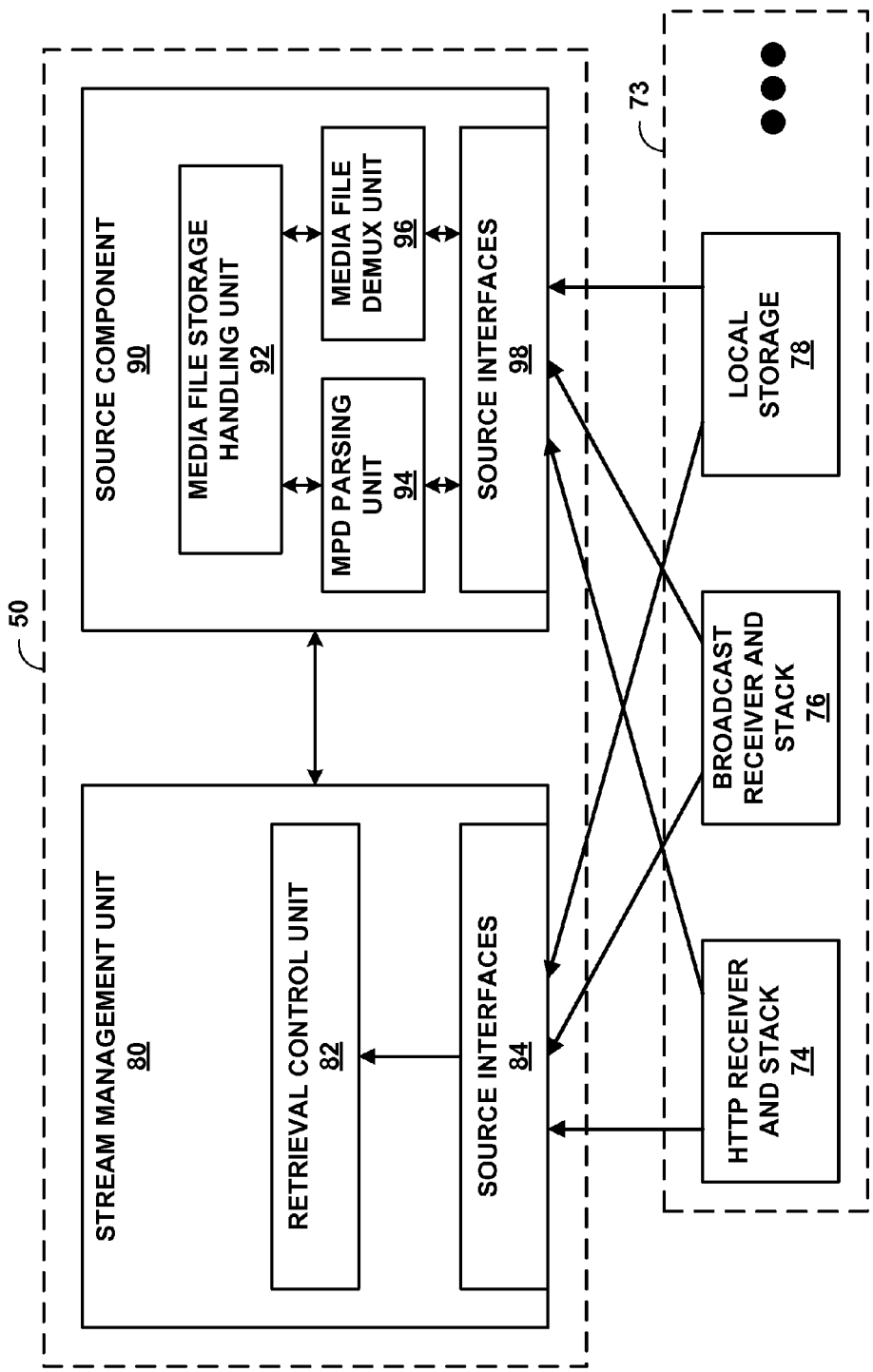
FIG. 3 is a block diagram illustrating an example set of components for a multi-source retrieval unit.

FIG. 3 is a block diagram illustrating an example set of components for multi-source retrieval unit 50. Multi-source retrieval unit 50 of FIG. 3 may correspond to either multi-source retrieval unit 50A (FIG. 1) or multi-source retrieval unit 50B (FIG. 2), or be included in another, different retrieval device. In this example, multi-source retrieval unit 50 includes stream management unit 80 and source component 90. Stream management unit 80 includes retrieval control unit 82 and source interfaces 84, while source component 90 includes media file storage handling unit 92, MPD parsing unit 94, media file demultiplexing (DEMUX) unit 96, and source interfaces 98.

In the example of FIG. 3, source interfaces 84 and source interfaces 98 communicate with interfaces 73, including HTTP receiver and stack 74, broadcast receiver and stack 76, and local storage 78. Interfaces 73 may generally correspond to interfaces 54 (FIG. 1) or interfaces 72 (FIG. 2). As indicated by ellipses, interfaces 73 may include additional interfaces for retrieving multimedia data from other sources in addition to, or in the alternative to, server device 60, broadcast server device 62, and a physical medium produced by physical media production facility 64.

Each of interfaces 73 may include hardware and/or software for communicating using specific communication protocols or interacting with specific physical media. For example, HTTP receiver and stack 74 may implement HTTP and receive data using the HTTP stack, which may include TCP/IP as well as other communication protocols for other layers of the network. HTTP receiver and stack 74 may further generate HTTP Get or partial Get requests for segments (or portions of segments) from, e.g., server device 60. Broadcast receiver and stack 76 may implement a broadcast or multicast protocol, such as eMBMS or IP multicast, to receive data from broadcast or multicast network transmissions. Broadcast receiver and stack 76 may be configured to subscribe to a broadcast or multicast network transmission in order to retrieve data of the transmission. Local storage 78 may correspond to an interface to locally stored data, e.g., on a memory, solid state or flash drive, DVD, Blu-ray disc, or other physical medium of, for instance, the client device 40A (FIG. 1) or the retrieval device 70 (FIG. 2).

Source component 90 may receive data of multimedia content from one or more sources via source interfaces 98, which in turn may receive the data from one or more of interfaces 73. Initially, source component 90 may receive a manifest file, such as an MPD file. MPD parsing unit 94 may parse the MPD file to determine available representations of the multimedia content, as well as adaptation sets including groups of the representations with common characteristics, and characteristics of the representations. Occasionally, source component 90 may receive an updated MPD for the current multimedia content, in which case MPD parsing unit 94 may parse the updated MPD and provide the updated information to stream management unit 80. In some examples, source component 90 may select at least one of the representations, while in other examples, source component 90 may provide the representation information to stream management unit 80. In such examples, stream management unit 80 may select at least one of the representations. In any case, source component 90 may send a request to stream management unit 80 to send download information for retrieving data for the multimedia content.

Stream management unit 80 may be configured to select one of sources 73 from which to retrieve data of the selected representation. Each of interfaces 73 may provide source notifications to stream management unit 80, such that stream management unit 80 is to select a particular source from which to retrieve the data. For example, HTTP receiver and stack 74 may provide an estimated amount of available network bandwidth to stream management unit 80 for HTTP transmissions. Broadcast receiver and stack 76 may provide indications of whether a URL for a broadcast transmission corresponding to the selected representation is available and whether the broadcast is in coverage. Local storage 78 may provide an indication of whether a URL is available for locally stored data corresponding to the selected representation. Source interfaces 84 represent one or more interfaces of stream management unit 80 for receiving the source notifications from the various interfaces that are communicatively coupled to the sources. In addition, stream management unit 80 may receive radio signal strength information (RSSI) from one or more radios of a wireless device, such as client device 40A, to determine the strength of a radio signal, e.g., for receiving network data.

Retrieval control unit 82 of stream management unit 80 analyzes the source notifications received via source interfaces 84 to select one or more of the sources from which to retrieve data for the multimedia content. In some examples, retrieval control unit 82 also selects a representation of the multimedia content. Retrieval control unit 82 may receive information from source component 90, such as representation characteristics extracted from an MPD file and URLs for segments of the representations. The information may further include indications of buffer occupancy and/or available space, as well as a current playback time of the multimedia content. Using this information, along with source notifications received from interfaces 73, retrieval control unit 82 may select a source from which to retrieve data for the multimedia content, e.g., data of a currently selected representation. Retrieval control unit 82 may adaptively switch between representations and/or sources from which to retrieve data for the representations over time for the same multimedia content.

Retrieval control unit 82 may provide indications of a selected source (and in some cases, a selected representation) to source component 90. In addition, retrieval control unit 82 may formulate a download command including information for retrieving data of the selected representation from the selected source. For example, the download command may include an indication of a source type and source-specific information. For example, for HTTP/1.1, the download command may specify the full path of a URL of a segment of the selected representation to be included in a Get or partial Get command. As another example, for a broadcast or multicast network transmission, the download command may specify the network address of a broadcast or multicast group to receive a segment of the selected representation. In this manner, stream management unit 80 may determine an appropriate source from which to retrieve data, as well as an appropriate segment of a representation to receive, based on information received from source component 90 and interfaces 73 (also referred to as source receivers).

Source component 90 may formulate an appropriate command to retrieve the data of the selected representation from the selected source, based on the download command information received from stream management unit 80. For example, source component 90 may generate an HTTP Get or partial Get request, a request to join a broadcast or multicast group, or a request to retrieve data of a local storage medium. Source component 90 may further issue the command to the appropriate one of interfaces 73 via source interface 98. That is, source component 90 may send the command to the one of interfaces 73 that is communicatively coupled to the source selected by stream management unit 80.

In response to the command, the one of interfaces 73 that issued the command may receive requested multimedia data of the selected representation from the selected source. Interfaces 73 may be configured to forward retrieved data to source component 90. In the example of FIG. 3, source component 90 includes media file demux unit 96, which may demultiplex the received data, e.g., into respective audio and video streams. Media file storage handling unit 92 may buffer received data in a memory (not shown) of a device including multi-source retrieval unit 50. Media file storage handling unit 92 may also provide demultiplexed data to, e.g., audio decoder 46 and video decoder 48 (FIG. 1). Alternatively, media file storage handling unit 92 may provide retrieved media data to client device 40B without demultiplexing the data.

In this manner, client device 40A (FIG. 1) and retrieval device 70 (FIG. 2) represent examples of devices configured to retrieve multimedia data conforming to DASH from one or more various sources. In these examples, the devices each include a plurality of interfaces, wherein each of the interfaces is communicatively coupled to a respective one of a plurality of sources. For example, client device 40A includes interfaces 54 that are communicatively coupled to source device 60, broadcast source device 62, and a storage medium produced by physical media production facility 64. As explained above, the interfaces may be communicatively coupled to other sources as well, such as an over-the-air broadcast source.

Accordingly, the interfaces may be configured to operate according to different communication protocols. For example, one of the interfaces may comprise a network interface configured to operate according to transmission control protocol/Internet protocol (TCP/IP). The same network interface (e.g., a different element of the network interface), or a different interface, may be configured to receive data according to IP multicast or eMBMS, or other broadcast or multicast network protocols. Another interface may be configured to receive data from a physical medium. Such an interface may comprise a universal serial bus (USB) interface, a DVD reader, a Blu-ray player, or other such interfaces for retrieving data from a physical medium.

Client device 40A (FIG. 1) and retrieval device 70 (FIG. 2) also represent examples of devices including a source component (e.g., source component 90 of FIG. 3) configured to select, using a manifest file for multimedia content, one of a plurality of representations from which to retrieve multimedia data of the multimedia content. The manifest file may include information indicative of the plurality of representations of the multimedia content, and the plurality of representations may include the selected one of the representations. Of course, it should be understood that as explained above, a stream management unit may also be configured to select the representation, rather than the source component. Moreover, the source component and the stream management unit may be functionally integrated, in some examples. Multimedia data for the representations may be available from the plurality of sources, such as server device 60, broadcast server device 62, and a physical medium produced by physical media production facility 64.

Client device 40A (FIG. 1) and retrieval device 70 (FIG. 2) also represent examples of devices including a stream management unit configured to select one of the sources from which to retrieve multimedia data for the selected representation. As discussed above, stream management unit 80 may analyze source notifications received from interfaces 73, RSSI information from a wireless radio of a mobile device, representation characteristics, segment information for segments of the representations, and other such information to select the source from which to retrieve the data for the selected representation of the multimedia content.

Ultimately, the source component may be configured to retrieve multimedia data for the selected representation from the selected source via the one of the interfaces that is communicatively coupled to the selected source. For example, if stream management unit 80 selects server device 60 as the source of multimedia data, source component 90 may retrieve the multimedia data via HTTP receiver and stack 74. As another example, if stream management unit 80 selects broadcast server device 62 as the source of the multimedia data, source component 90 may retrieve the multimedia data via broadcast receiver and stack 76. As still another example, if stream management unit 80 selects a local storage medium as the source of the multimedia data, source component 90 may retrieve the multimedia data via local storage 78.

In this manner, client device 40A and retrieval device 70 represent examples of devices that may implement the techniques of this disclosure for retrieving multimedia data of the same multimedia content from a variety of different sources, where the multimedia content may conform to DASH. The ability to retrieve data for multimedia content from different sources may be advantageous in a variety of scenarios. As one example, multiple sources for the same content may provide redundancy, such that a client device can determine whether a particular source is available when another source is not available.

As another example, certain representations may be stored only by certain sources. For example, a relatively high quality representation may be available via broadcast, whereas a relatively low quality representation may be available via unicast. A client device may initially retrieve data of the relatively low quality representation via unicast, then switch to the broadcast or multicast transmission after buffering a sufficient amount of data of the unicast representation to reach a random access point (RAP) of the broadcast representation.

In some cases, a client device may enhance data received from one source by retrieving data from another source. For example, the client device may retrieve multimedia data from a first source, and retrieve additional multimedia data for a common temporal playback period from a second, different source. The client device may retrieve alternate or additional data to replace or supplement data received from a particular source. As an example, DVDs typically include previews for upcoming movies as of the time the DVDs are produced. In accordance with the techniques of this disclosure, a client device may retrieve multimedia data for previews from a server device, rather than from a DVD itself, such that the previews are relatively current. Similarly, content of a DVD or other locally accessed data storage medium may be augmented using these techniques to provide for alternate endings, directors' cuts, special features, deleted scenes, or other additions or modifications to the video data of the DVD.

As another example, a DVD or other storage medium may store data of a particular quality, e.g., a base layer of scalable video coding (SVC) data. A client device may determine whether an additional source, such as a network source, is available to retrieve one or more enhancement layers to enhance the base layer. In the case that no network connection is available, the client device may still decode and render the base layer. However, if a network connection is available, the client device may retrieve data for the one or more enhancement layers.

As yet another example, a DVD or other storage medium may include a single view of video data, e.g., to support two-dimensional (2D) video playback. Rather than purchasing a separate DVD to support three-dimensional (3D) video playback, in accordance with this disclosure, the client device may retrieve an alternate view from, e.g., a network source, and display the two views as a stereo view pair to provide three-dimensional video playback. Of course, the client device may also retrieve additional views for multi-view video playback, in accordance with multiview video coding (MVC).

As still another example, a DVD may include a movie of a particular rating (e.g., G, PG, PG-13, R), where the rating describes content suitability for a particular audience. The techniques of this disclosure may be used to implement parental controls. For example, if the movie on the DVD is not suitable for a current audience, a parent or other guardian may configure the client device to retrieve alternate audio and/or video data to replace inappropriate scenes. Alternatively, the DVD may store relatively benign video content, and the client device may be configured to retrieve supplement audio and/or video data from a network source that might otherwise be unsuitable for a particular audience.

Figure 4:
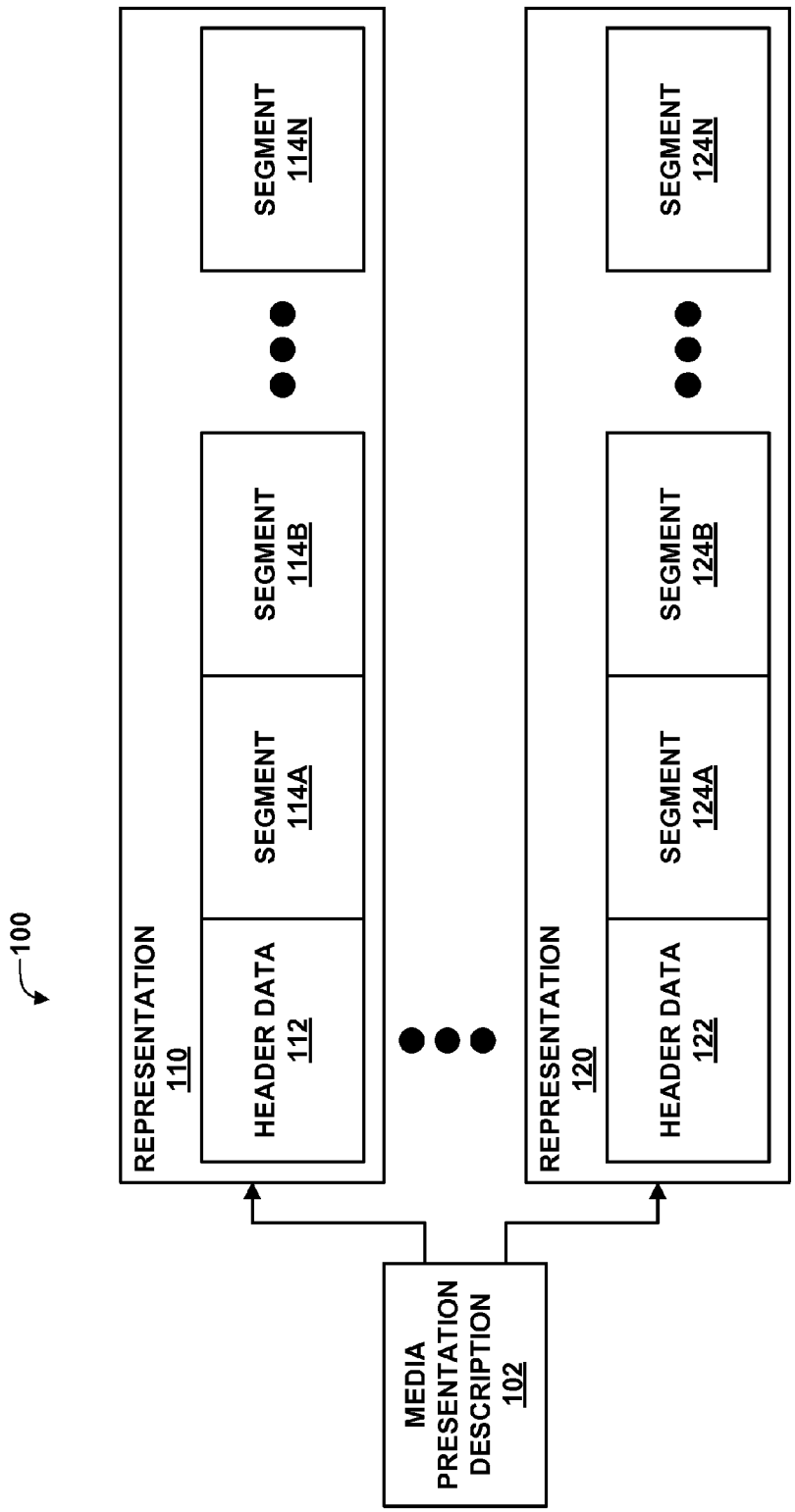
FIG. 4 is a conceptual diagram illustrating elements of an example multimedia content.

FIG. 4 is a conceptual diagram illustrating elements of an example multimedia content 100. In the example of FIG. 4, multimedia content 100 includes media presentation description (MPD) 102 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 102 may comprise a data structure separate from representations 110-120. MPD 102 may correspond to manifest file 66 of FIG. 1. In general, MPD 102 may include data that generally describes characteristics of representations 110-120, such as coding and rendering characteristics, representation groups, a profile to which MPD 102 corresponds, text type information, camera angle information, rating information, trick mode information (e.g., information indicative of representations that include temporal subsequences), and/or information for retrieving remote periods (e.g., for targeted advertisement insertion into media content during playback). Remote periods may also be referred to as external periods.

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 102.

Segments 114 include one or more coded video samples, each of which may include frames or slices of video data. Each of the coded video samples of segments 114 may have similar characteristics, e.g., height, width, and bandwidth requirements. Such characteristics may be described by data of MPD 102, though such data is not illustrated in the example of FIG. 4. MPD 102 may include characteristics as described by the 3GPP Specification, with the addition of any or all of the signaled information described in this disclosure.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP Get request to retrieve segments 114 or 124. In some examples, client device 40 may use HTTP partial Get requests to retrieve specific byte ranges of segments 114 or 124. For example, if some data of a broadcast or from a local storage medium is lost or corrupted, client device 40 may retrieve as much uncorrupted data from the broadcast or local storage medium as possible and retrieve replacement data for the corrupted data using an HTTP partial GET request, in some examples.

In some examples, MPD 102 may refer to data of external periods (also referred to as remote periods). A period generally corresponds to a particular temporal section of multimedia content. Each period may include one or more representations, such as representations 110-120. An external period, however, may be inserted within or between periods of multimedia content 100. The external period may include multimedia data in addition to multimedia data of the multimedia content. For example, external periods may include advertisement data.

Periods may be defined by their duration, that is, the start time of the Period may depend on the duration of the previous Period. A client device may map external periods to an MPD structure. For live services, concatenation of MPDs may be achieved by a dynamic creation of the MPD on the server, such as server device 60, with appropriate update procedures. Other web technologies may also be used. URLs for externally defined periods may be processed in real-time to generate a new period containing advertisements targeted to a user of client device 40. Client device 40 may supply additional information with the request that may be used for advertisement targeting, for example, a user identifier, user preferences, user demographic information, or other information.

Table 1 below illustrates an example set of information that may be provided in MPD 102 to describe one or more Periods of multimedia content, and to indicate the presence of external periods:

TABLE 1

MPD Period Information

| Period | E | 1 ... N | M | Provides the information of a Period |
|---|---|---|---|---|
| PeriodAttributes | List | | M | already existing period attributes |
| periodDuration | A | | O | Provides the period duration, may be used as alternative to start attribute of next Period. |
| representationGroupListURI | A | | O | URI that points to a document that contains a list of Representations. |
| RepresentationGroups | E | 0 ... N | | This element contains a description of a Representation Group |
| periodListURI | A | | M | URI that points to a document that contains one or several Period elements. |

In this manner, the Period element of MPD 102 may refer to external (or remote) periods, e.g., using periodListURI. For On-Demand content, indications of period durations may be more useful for client devices, such as client device 40, than start times to support external periods. An MPD may include a sequence of Periods, where Periods can be internal or external. Using such remote Periods, along with user-specific information, may allow for targeted user advertising. Server device 60 and/or content preparation device 20 may be configured to dynamically generate separate MPDs for each user, or for each client device. Client device 40, or another device, may concatenate the playout of a targeted advertisement and a live service, e.g., using the dynamically-created MPD.

In this manner, the techniques of this disclosure may support situations in which a service provider offers On-Demand content through 3GPP AHS. The content may include several scenes, and between each scene, an advertisement may be added. The advertisement may differ for each user. That is, targeted advertising may be added. In addition, each advertisement may be of a different duration. Likewise, a service provider may offer a particular live service (e.g., a free service). When accessing the live service, the service provider may add an advertisement that may or may not be targeted to a user. The duration of the advertisement may differ, depending on access time, the access location, the user, and the like.

Additionally or alternatively, the external period may include additional or replacement data corresponding to a common temporal playback period for the multimedia data. As discussed above, such additional or replacement data may be used to modify the multimedia data, e.g., to change the actual content of the multimedia data for changing a rating, storyline, or other characteristic of the multimedia data. Moreover, the external period may include supplemental data, such as enhancement layer data for SVC, one or more additional views for MVC, or depth maps from which additional views can be generated when applied to one or more existing views.

Figure 5:
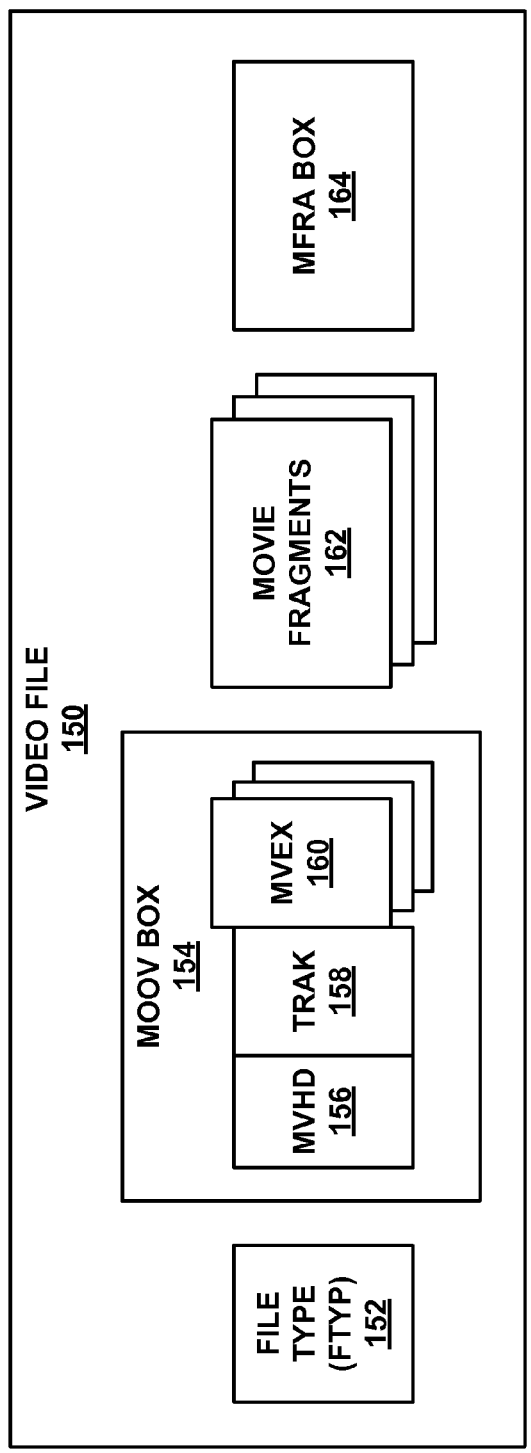
FIG. 5 is a block diagram illustrating elements of an example video file, which may correspond to a segment of a representation of multimedia content.

FIG. 5 is a block diagram illustrating elements of an example video file 150, which may correspond to a segment of a representation, such as one of segments 114, 124 of FIG. 4. Each of segments 114, 124 may include data that conforms substantially to the arrangement of data illustrated in the example of FIG. 5. Similarly, segments of FIGS. 6-7 discussed below may also conform substantially to the structure of video file 150. As described above, video files in accordance with the ISO base media file format and extensions thereof store data in a series of objects, referred to as "boxes." In the example of FIG. 5, video file 150 includes file type (FTYP) box 152, movie (MOOV) box 154, movie fragment (MOOF) boxes 162, and movie fragment random access (MFRA) box 164.

File type (FTYP) box 152 generally describes a file type for video file 150. File type box 152 may include data that identifies a specification that describes a best use for video file 150. File type box 152 may be placed before MOOV box 154, movie fragment boxes 162, and MFRA box 164.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 5, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 162, which may be referenced by data of TRAK box 158.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 162, e.g., to signal that video file 150 includes movie fragments 162, in addition to video data included within MOOV box 154, if any. In the context of streaming video data, coded video pictures may be included in movie fragments 162 rather than in MOOV box 154. Accordingly, all coded video samples may be included in movie fragments 162, rather than in MOOV box 154.

MOOV box 154 may include a number of MVEX boxes 160 equal to the number of movie fragments 162 in video file 150. Each of MVEX boxes 160 may describe characteristics of a corresponding one of movie fragments 162. For example, each MVEX box may include a movie extends header box (MEHD) box that describes a temporal duration for the corresponding one of movie fragments 162.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 162. Encapsulation unit 30 may further signal the presence of a sequence data set and/or sequence level SEI messages as being present in one of movie fragments 162 within the one of MVEX boxes 160 corresponding to the one of movie fragments 162.

Movie fragments 162 may include one or more coded video pictures. In some examples, movie fragments 162 may include one or more groups of pictures (GOPs), each of which may include a number of coded video pictures, e.g., frames or pictures. In addition, as described above, movie fragments 162 may include sequence data sets in some examples. Each of movie fragments 162 may include a movie fragment header box (MFHD, not shown in FIG. 5). The MFHD box may describe characteristics of the corresponding movie fragment, such as a sequence number for the movie fragment. Movie fragments 162 may be included in order of sequence number in video file 150.

MFRA box 164 may describe random access points within movie fragments 162 of video file 150. This may assist with performing trick modes, such as performing seeks to particular temporal locations within video file 150. MFRA box 164 is generally optional and need not be included in video files, in some examples. Likewise, a client device, such as client device 40, does not necessarily need to reference MFRA box 164 to correctly decode and display video data of video file 150. MFRA box 164 may include a number of track fragment random access (TFRA) boxes (not shown) equal to the number of tracks of video file 150, or in some examples, equal to the number of media tracks (e.g., non-hint tracks) of video file 150.

Segments 114, 124 may each be formatted similarly to video file 150. Moreover, each of segments 114, 124 may be associated with a respective URL. Because segments 114, 124 may be stored at different sources, a path portion of the URL may specify the source from which the corresponding segment is available. For example, for data stored on a local storage medium, the URL path portion may begin with, "file:/f" to indicate that the data for the URL is stored as a file on local storage, rather than at a network address.

Figure 6:
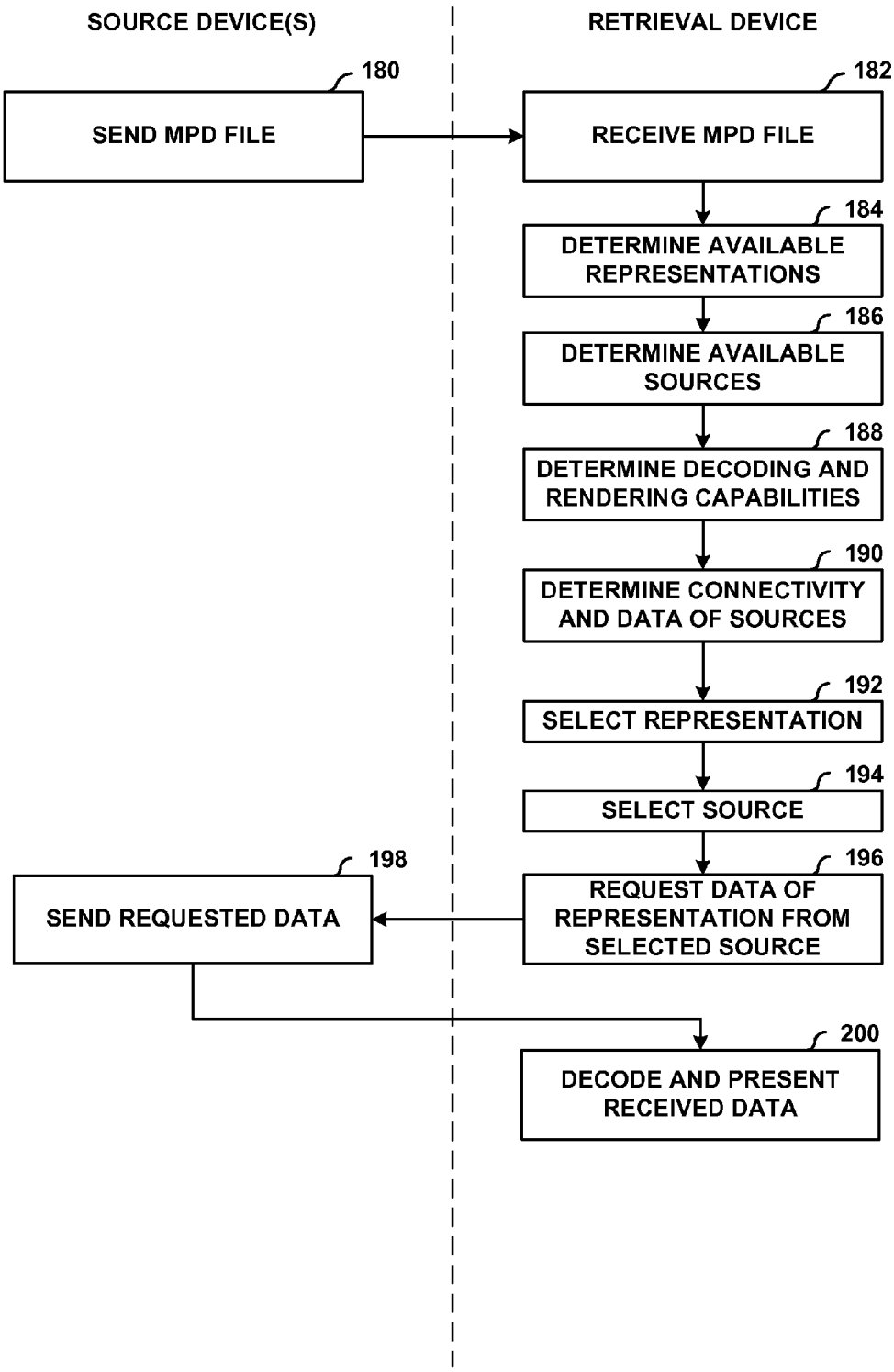
FIG. 6 is a flowchart illustrating an example method for retrieving multimedia data from one or more of a variety of different sources.

FIG. 6 is a flowchart illustrating an example method for retrieving multimedia data from one or more of a variety of different sources. Although described with respect to the devices of the example of FIG. 1, it should be understood that other devices may be configured to perform steps of the method of FIG. 6. For example, retrieval device 70 of FIG. 2 may be configured to perform the steps attributed to the retrieval device in FIG. 6. The steps of the method of FIG. 6 may be performed iteratively for each segment or period of multimedia content. Certain steps may omitted and additional steps may be added. Moreover, certain steps be performed in parallel.

In the example of FIG. 6, initially, a source device sends an MPD file to a retrieval device, such as client device 40A (180). The MPD file generally corresponds to particular multimedia content. Client device 40A (representing an example of a retrieval device) may then receive the MPD file (182). Source component 90 may receive and parse the MPD file to extract information from the MPD file indicative of representations, characteristics of the representations, URLs for segments of the representations, and other such information. Source component 90 may provide this information to stream management unit 80.

Stream management unit 80 may determine available representations of the multimedia content using the information received from source component 90 (184). Stream management unit 80 may also determine available sources from which data of the multimedia content may be retrieved (186).

Stream management unit 80 may further determine decoding and rendering capabilities of client device 40A (188). For example, stream management unit 80 may determine a profile and/or level to which video decoder 48 conforms, a screen size of video output 44, a refresh rate of video output 44, a number of views that can be displayed by video output 44 at substantially the same time, or other such capabilities.

In addition, stream management unit 80 may determine connectivity and data of various sources (190). For example, stream management unit 80 may receive and analyze source notifications, such as RSSI information for a wireless radio, predicted available bandwidth for HTTP traffic (relating to the availability of server device 60), whether a broadcast or multicast for the multimedia content can be received and whether a URL for the broadcast or multicast is available (relating to the availability of broadcast server device 62), and/or whether a URL is available for a local physical medium storing data of the multimedia content (relating to the availability of a local storage medium produced by physical media production facility 64).

Using the information discussed above, stream management unit 80 may select a representation of the multimedia content (192), as well as a source from which to retrieve data (e.g., segments) of the selected representation (194). Stream management unit 80 may then provide an indication of the selected representation and source to source component 90. Source component 90, in turn, may request data of the representation from the selected source (196).

For example, when server device 60 is selected, source component 90 may request data from server device 60 using an HTTP Get or partial Get that specifies a URL associated with a segment of the representation. As another example, when broadcast server device 62 is selected, source component 90 may generate a request to join a broadcast or multicast group to receive data of the selected segment from broadcast server device 62. As still another example, when the local storage is selected, source component 90 may generate a request to retrieve data from the local storage. This may specify a URL associated with a segment stored by the local storage medium.

The corresponding source device may then send the requested data to the retrieval device, e.g., client device 40A (198). After receiving the requested data, client device 40A may demultiplex the received data to form corresponding audio and video streams. Client device 40A may then decode and present the received data (200), e.g., by decoding and presenting (e.g., rendering) the demultiplexed audio and video streams. In other examples, e.g., when retrieval device 70 (FIG. 2) implements techniques of the method of FIG. 6, retrieval device 70 may provide the retrieved data to client device 40B, and client device 40B may decode and render the retrieved media data.

In this manner, the method of FIG. 6 represents an example of a method including selecting, using a manifest file for multimedia content, one of a plurality of representations from which to retrieve multimedia data of the multimedia content. The manifest file may include information indicative of the plurality of representations of the multimedia content, the plurality of representations may include the selected one of the representations, and multimedia data for the representations may be available from a plurality of sources. The method may further include selecting one of the sources from which to retrieve multimedia data for the selected representation. Moreover, the method may include retrieving at least a portion of the multimedia data for the selected representation from the selected source.

Figure 7:
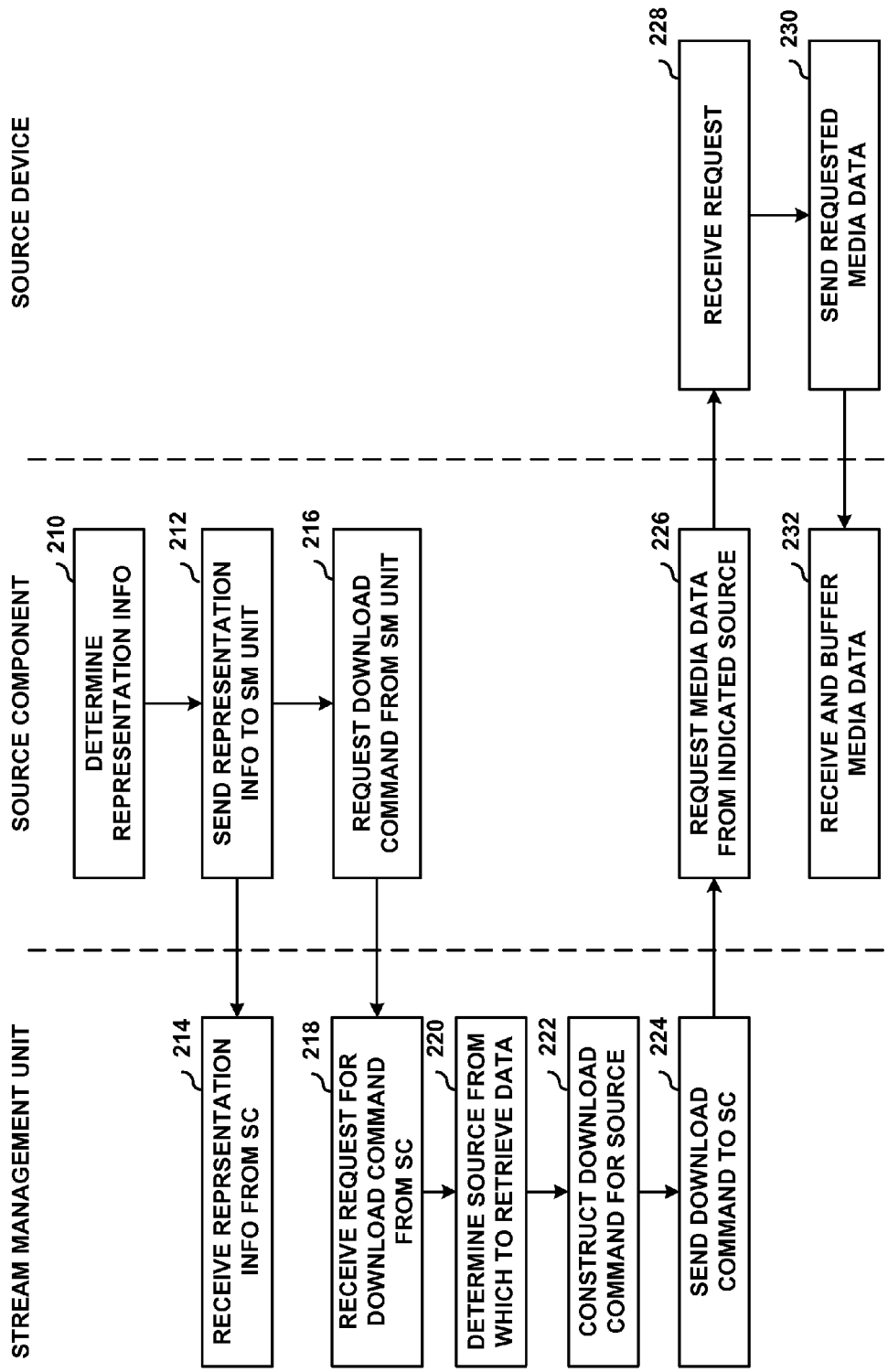
FIG. 7 is a flowchart illustrating an example method for retrieving data of multimedia content from a one or more of a variety of sources in greater detail.

FIG. 7 is a flowchart illustrating an example method for retrieving data of multimedia content from a one or more of a variety of sources in greater detail. The method of FIG. 7 is described with respect to the components of FIG. 3, for purposes of example and explanation. It should be understood that devices including components similar to multi-source retrieval unit 50 of FIG. 3 may be configured to perform a method similar to that of FIG. 7. Again, the steps of the method of FIG. 7 may be performed in a different order, or in parallel, and additional steps may be performed or certain steps may be omitted.

In this example, source component 90 may determine representation information using, e.g., a received MPD file, for multimedia content (210). As discussed above, the representation information may include decoding and rendering characteristics, URLs for segments, or other such information for the multimedia content. Source component 90 may send the representation information to stream management unit 80 (212), and stream management unit 80 may receive the representation information (214). In addition, in some examples, stream management unit 80 may select one of the representations using the representation information.

Source component 90 may also request a download command from stream management unit 80 (216). Stream management unit 80 may then receive the request for the download command from source component 90 (218). In response, stream management unit 80 may determine a source from which to retrieve data of the selected representation (220). Stream management unit 80 may then construct a download command for the selected source and data (e.g., a segment) of the selected representation (222). Accordingly, the download command may be formatted according to a protocol implemented by the selected source, for example. Stream management unit 80 may then send the download command to source component 90 (224).

Source component 90 may use the download command to request multimedia data from the indicated source, that is, the source selected by stream management unit 80 (226). In response to receiving the request (228), the source device may send the requested multimedia data (230). Source component 90 may receive and buffer the requested multimedia data (232). Source component 90 may then demultiplex the buffered data, or send the data to another device to be demultiplexed.

Figure 8:
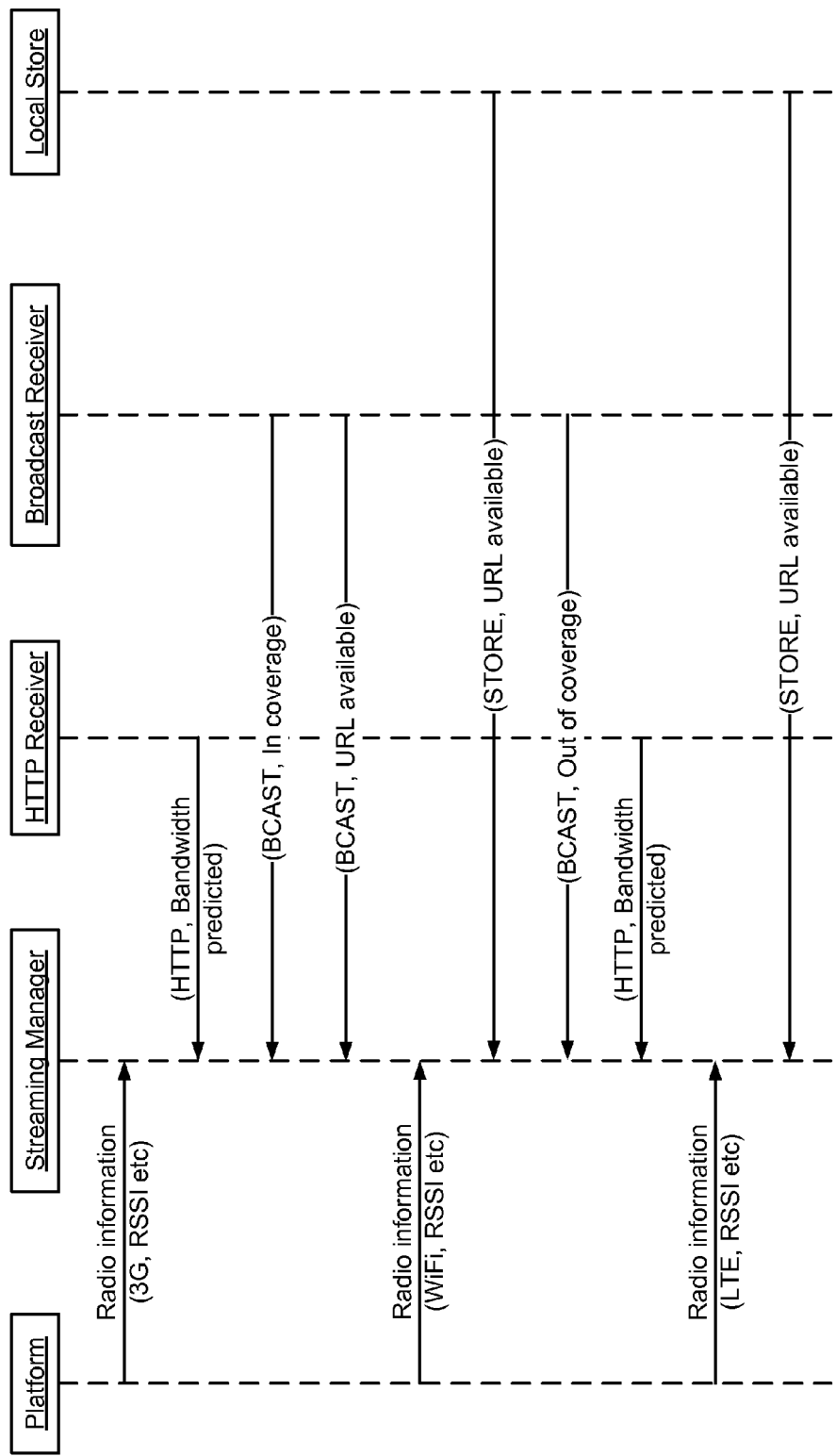
FIG. 8 is a flowchart illustrating a conceptual timing diagram in which a streaming manager receives source notifications from various interfaces that are communicatively coupled to respective sources.

FIG. 8 is a flowchart illustrating a conceptual timing diagram in which a streaming manager (e.g., stream management unit 80) receives source notifications from various interfaces that are communicatively coupled to respective sources. In this example, stream management unit 80 may receive information from a platform (e.g., the operating system of a mobile device) indicating received signal strength information for various radios of the platform, such as a 3G (Third Generation Partnership Project) wireless radio, a wireless network (e.g., IEEE 802.11x, often referred to as "WiFi") radio, and a Long Term Evolution (LTE) radio.

Stream management unit 80 may also receive predicted bandwidth information from an HTTP receiver, such as HTTP receiver and stack 74 (FIG. 3). Furthermore, stream management unit 80 may receive indications of whether a broadcast network is within coverage (e.g., within a radio access network (RAN) to which a mobile device is communicatively coupled), as well as a URL for the broadcast when the broadcast network is within coverage of the RAN. Moreover, stream management unit 80 may receive indications of whether a URL for data of a representation is available for data stored by local storage, such as local storage 78 (FIG. 3).

Figure 9:
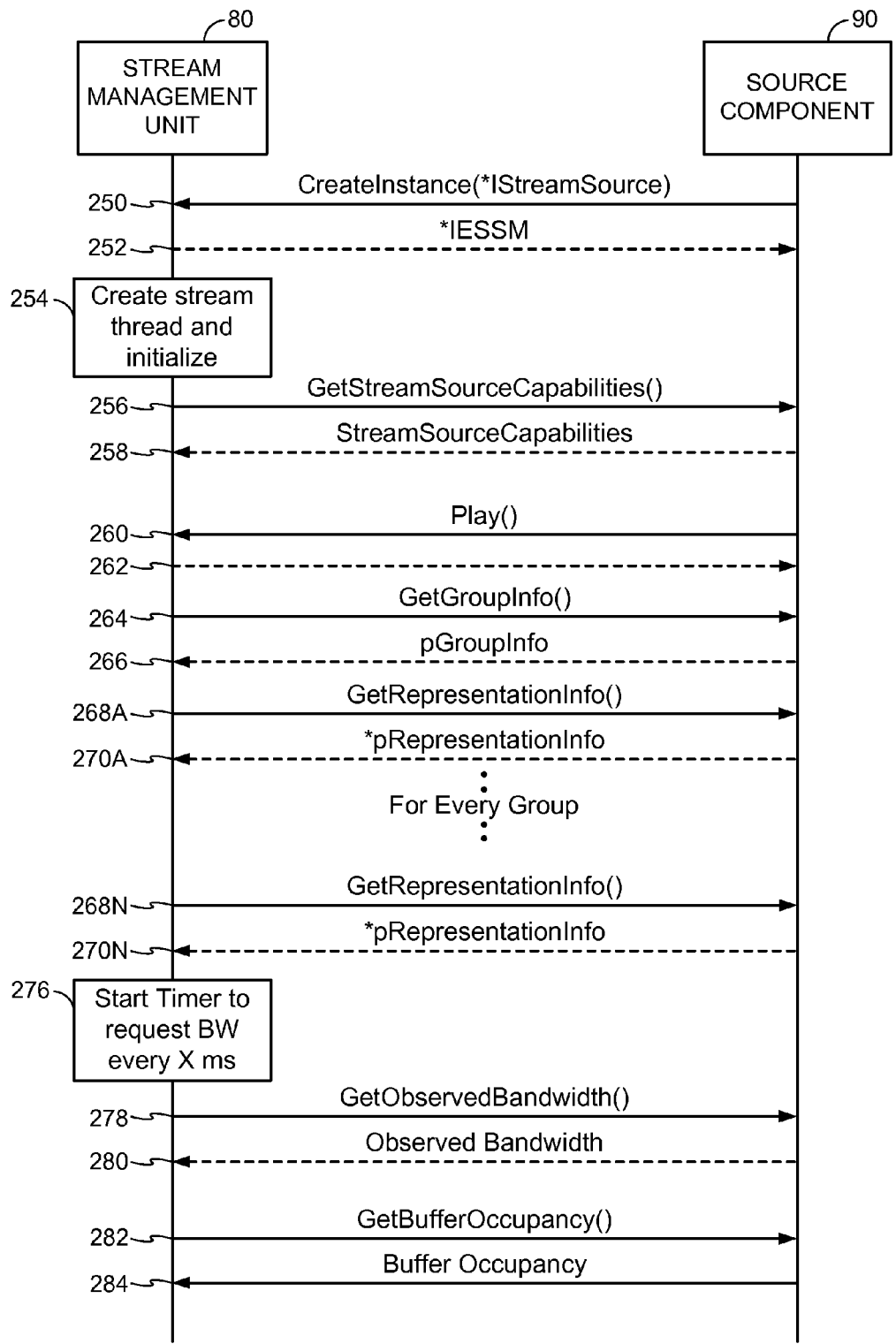
FIG. 9 is a flowchart illustrating an example method for initializing a stream in accordance with Dynamic Adaptive Streaming over HTTP (DASH), which may be applied to initialize a stream from one or more various sources in accordance with the techniques of this disclosure.

FIG. 9 is a flowchart illustrating an example method for initializing a stream in accordance with DASH, which may be applied to initialize a stream from one or more various sources in accordance with the techniques of this disclosure. Initially, source component 90 may create a stream instance (250). Stream management unit 80 may respond with a created stream instance (252). Stream management unit 80 may also create and initialize a stream management thread for the created stream instance (254). Stream management unit 80 may request stream source capabilities from source component 90 (256). Source component 90 may respond with determined stream source capabilities (258).

Source component 90 may then issue a play request to stream management unit 80 (260), which stream management unit 80 may acknowledge (262). In order to begin playing multimedia content, stream management unit 80 may request group information for representation groups (e.g., adaptation sets) of the multimedia content (264). Source component 90 may determine the available adaptation sets and common characteristics for the representations corresponding to the adaptation sets, and provide this information to stream management unit 80 (266).

For each of the adaptation sets, stream management unit 80 may request information describing characteristics of representations in the adaptation set (268A-268N). Source component 90 may respond with the requested information describing characteristics of the representations in the adaptation sets (270A-270N). Stream management unit 80 may then begin a timer that may be used to request determined available bandwidth periodically, e.g., every X milliseconds (ms) (276). Accordingly, when the timer elapses, stream management unit 80 may request an observed bandwidth (278), and source component 90 may respond with a determined amount of bandwidth (280). Alternatively, one of interfaces 73 may respond with the determined amount of bandwidth. Likewise, additionally or alternatively, stream management unit 80 may request characteristics of communication sessions with other sources as well, such as broadcast server device 62 and a physical storage medium produced by physical media production facility 64. Stream management unit 80 may also request an amount of occupied buffer space from source component 90 (282), in response to which, source component 90 may provide an indication of the amount of buffer space that is currently occupied, e.g., as determined by media file storage handling unit 92.

Figure 10:
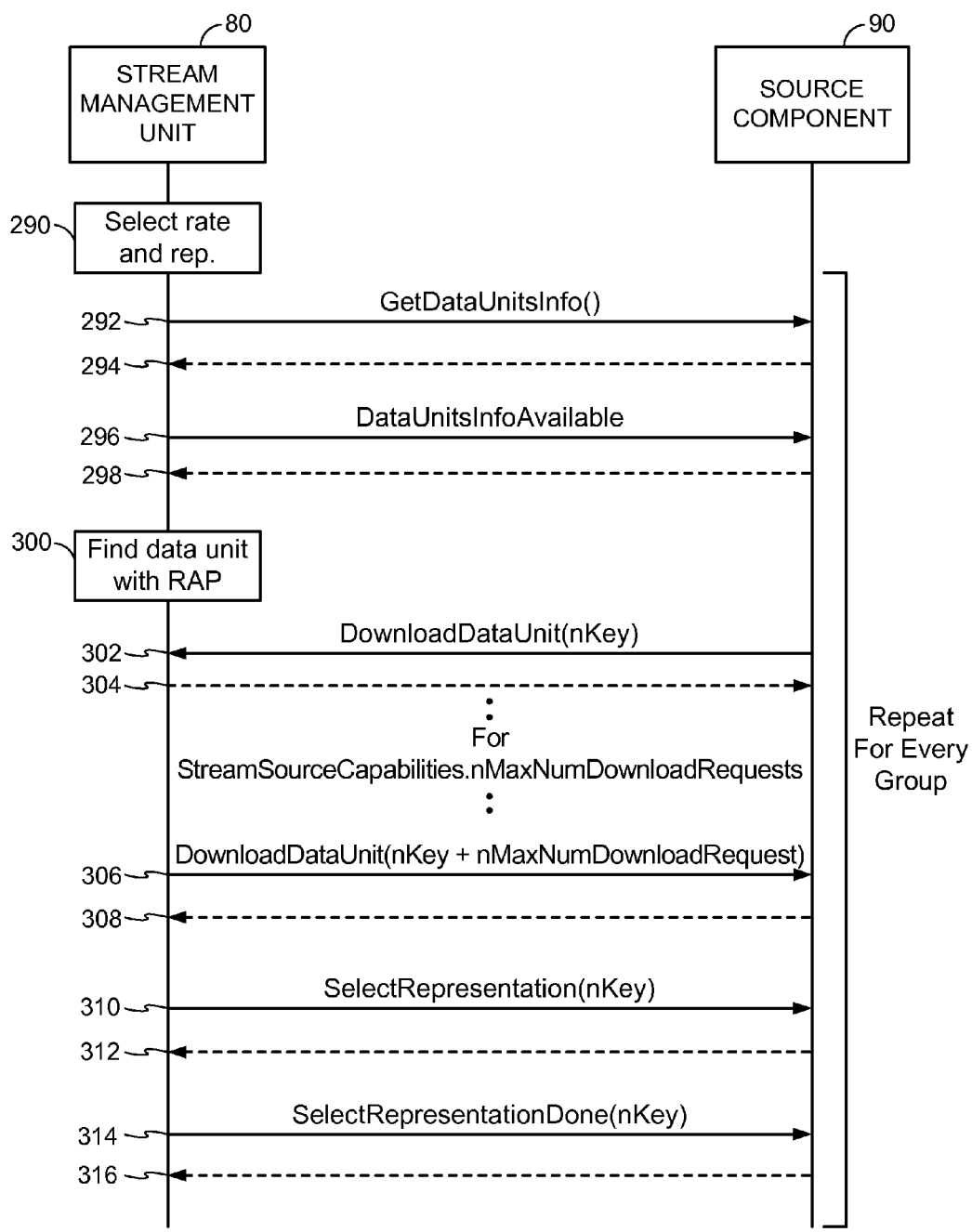
FIG. 10 is a flowchart illustrating an example method for retrieving information for data units (e.g., segments) of representations of multimedia content.

FIG. 10 is a flowchart illustrating an example method for retrieving information for data units (e.g., segments) of representations of multimedia content. In accordance with the techniques of this disclosure, segments of multimedia content may be retrieved from one or more various sources, e.g., in accordance with different communication protocols. In the example of FIG. 10, stream management unit 80 may first select a bitrate and a representation (290). Stream management unit 80 may determine the bitrate based on an amount of available network bandwidth, as determined at steps 278 and 280 of FIG. 9. Stream management unit 80 may then select a representation based on the bitrate, as well as other factors such as decoding and rendering capabilities of the client device. Moreover, the steps in the method of FIG. 10 may be iteratively repeated for each adaptation set (e.g., each group of representations).

After selecting a representation, stream management unit 80 may request data unit information, e.g., segment information (292). Source component 90 may acknowledge the request (294) and determine the requested segment information from the MPD file or another data structure for the multimedia content, such as a segment index box (SIDX). Source component 90 may then send the determined information to stream management unit 80, including an indication of available data units (e.g., segments) (296). Stream management unit 80 may then acknowledge the information regarding the available data units (298).

Through analyzing the information received from source component 90, stream management unit 80 may determine a data unit (e.g., segment) that includes a random access point (RAP) (300). As explained above, a RAP may correspond to an I-frame or set of I-slices corresponding to the same frame. Stream management unit 80 may then issue a command to source component 90 to retrieve the data unit (e.g., segment) including the RAP (302). Source component 90 may then retrieve the data unit including the RAP and confirm receipt (304).

Stream management unit 80 may further construct commands to request up to a maximum number of download requests and issue each of the commands to source component 90, which may use the commands to retrieve the corresponding data (304-308). Stream management unit 80 may then select a representation, indicated to source component 90 (310), and source component 90 may confirm the selection (312). Source component 90 may indicate when representation selection has finished (314), and stream management unit 80 may confirm receipt (316). In this manner, multi-source retrieval unit 50 may obtain information describing various representations of the multimedia content, such as locations of random access points for the representations.

Figure 11:
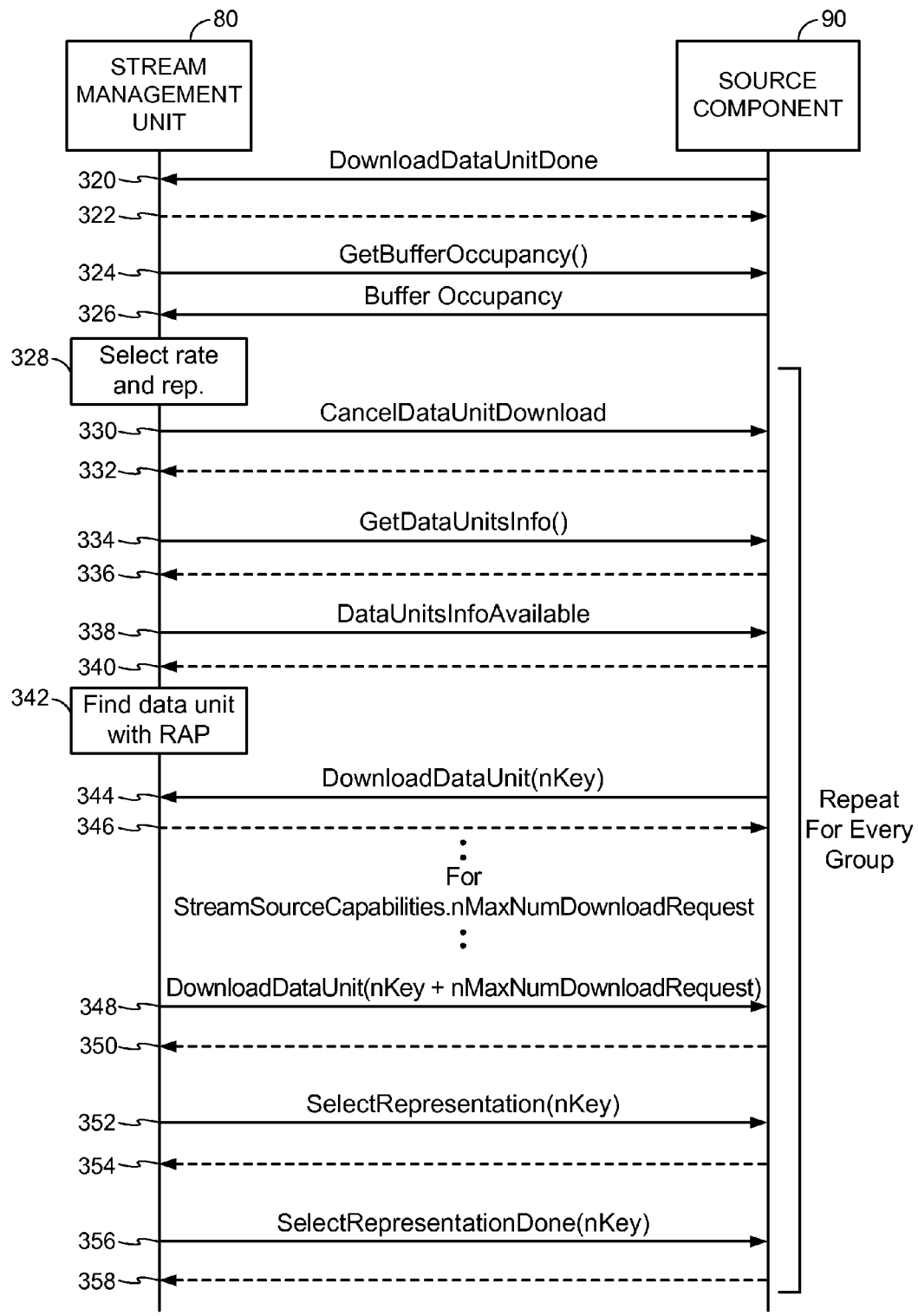
FIG. 11 is a flowchart illustrating an example method for adapting to a change in available network bandwidth, e.g., to perform rate reselection.

FIG. 11 is a flowchart illustrating an example method for adapting to a change in available network bandwidth, e.g., to perform rate reselection. The method of FIG. 11 may follow retrieval of a data unit, e.g., a segment. Accordingly, source component 90 may indicate that the data unit has been downloaded (320), which stream management unit 80 may confirm (322). Steps 324-326 may conform substantially to steps 282-284 of FIG. 9. In this example, stream management unit 80 may make a determination that the amount of available network bandwidth has changed, and likewise, select a different representation (328). After selecting a different representation, stream management unit 80 may instruct source component 90 to cancel retrieval of the current data unit, e.g., the current segment (320), and thus, source component 90 may cancel retrieval of the current segment (322). Following this, steps 330-358 conform substantially to respective steps 292-316 (FIG. 10).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving multimedia data, the method comprising:
    selecting, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, and wherein the manifest file is separate from each of the plurality of representations;
    determining, from the manifest file, a plurality of sources, including a broadcast source and a unicast source, that the manifest file indicates include the selected one of the representations;
    selecting one of the sources from which to retrieve multimedia data for the selected representation; and
    retrieving at least a portion of the multimedia data for the selected representation from the selected source.

2. The method of claim 1, wherein the manifest file comprises a media presentation description (MPD) file formatted according to extensible markup language (XML), wherein the MPD file includes information indicative of uniform resource locators (URLs) of segments of the representations and characteristics of the representations.

3. The method of claim 1, further comprising retrieving additional multimedia data from a second source of the sources other than the selected source, wherein the multimedia data and the additional multimedia data correspond to a common temporal playback period.

4. The method of claim 3, wherein the multimedia data for the selected one of the representations comprises video data corresponding to a base view, and wherein the additional multimedia data comprises video data of an enhancement layer.

5. The method of claim 3, wherein the additional multimedia data comprises an external period relative to the multimedia content.

6. The method of claim 3, wherein the additional multimedia data comprises advertisement multimedia data.

7. The method of claim 1, further comprising:
    determining availability of the representations using data of the manifest file; and
    determining coding characteristics, display characteristics, and bitrates of the representations from the manifest file,
    wherein selecting one of a plurality of representations comprises selecting the representation based on the coding characteristics of the representation, the display characteristics of the representation, and the bitrate of the representation.

8. The method of claim 7, further comprising:
    determining coding capabilities of a client device; and
    determining rendering capabilities of the client device,
    wherein selecting one of a plurality of representations comprises selecting the representation such that the coding capabilities of the client device satisfy the coding characteristics of the representation and such that the rendering capabilities of the client device satisfy the display characteristics of the representation.

9. The method of claim 1, further comprising determining availability of the sources based on information received from the sources, wherein selecting one of the sources comprises selecting one of the available sources.

10. A device comprising:
    a plurality of interfaces, wherein each of the interfaces is communicatively coupled to a respective one of a plurality of sources, including a broadcast source and a unicast source;
    a stream management unit configured to:
        select, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, and wherein the manifest file is separate from each of the plurality of representations,
        determine, from the manifest file, that the plurality of sources, including the broadcast source and the unicast source, include the selected one of the representations, and
        select one of the sources from which to retrieve multimedia data for the selected representation; and
    a source component configured to retrieve multimedia data for the selected representation from the selected source via the one of the interfaces that is communicatively coupled to the selected source.

11. The device of claim 10, further comprising:
    a computer-readable storage medium comprising instructions for the functions attributed to the source component and the stream management unit; and
    one or more processors configured to execute the instructions for the source component and the stream management unit.

12. The device of claim 10, wherein the plurality of interfaces comprise one or more of a first network interface implementing a hypertext transport protocol (HTTP) stack, a second network interface implementing a broadcast stack for receiving broadcast network transmissions, and a computer-readable storage medium interface for retrieving data from a computer-readable storage medium.

13. The device of claim 12, wherein the computer-readable storage medium comprises digital video disc (DVD) or Blu-ray disc.

14. The device of claim 12, wherein the stream management unit is configured to determine whether a network connection is available, to select one of the sources communicatively coupled to the first network interface or the second network interface when the network connection is determined to be available, and to select one of the sources communicatively coupled to the computer-readable storage medium interface when the network connection is determined to not be available.

15. The device of claim 12, wherein the stream management unit is configured to receive predicted bandwidth information from the first network interface, information indicating whether a broadcast is available and whether a URL for the broadcast is available from the second network interface, and whether a URL for the multimedia data is available from the computer-readable storage medium interface, and wherein the stream management unit is configured to select the one of the sources based at least in part on the received information.

16. The device of claim 10,
wherein the stream management unit is configured to select additional multimedia data from a second source of the sources other than the selected source, wherein the multimedia data and the additional multimedia data correspond to a common temporal playback period, and
wherein the source component is configured to retrieve the additional multimedia data via the interface that is communicatively coupled to the second source.

17. A computer program product comprising a non-transitory computer-readable storage medium having stored thereon instructions that, when executed, cause a processor to:
select, using a manifest file for multimedia content, one of a plurality of representations from which to retrieve multimedia data of the multimedia content, wherein the manifest file includes information indicative of the plurality of representations of the multimedia content, wherein the plurality of representations includes the selected one of the representations, and wherein the manifest file is separate from each of the plurality of representations;
determine, from the manifest file, a plurality of sources, including a broadcast source and a unicast source, that the manifest file indicates include the selected one of the representations;
select one of the sources from which to retrieve multimedia data for the selected representation; and
retrieve at least a portion of the multimedia data for the selected representation from the selected source.

18. The computer program product of claim 17, wherein the manifest file comprises a media presentation description (MPD) file formatted according to extensible markup language (XML), wherein the MPD file includes information indicative of uniform resource locators (URLs) of segments of the representations and characteristics of the representations.

19. The computer program product of claim 17, further comprising instructions that cause the processor to retrieve additional multimedia data from a second source of the sources other than the selected source, wherein the multimedia data and the additional multimedia data correspond to a common temporal playback period.

20. The computer program product of claim 19, wherein the multimedia data for the selected one of the representations comprises video data corresponding to a base view, and wherein the additional multimedia data comprises video data of an enhancement layer.

21. The computer program product of claim 19, wherein the additional multimedia data comprises an external period relative to the multimedia content.

22. The computer program product of claim 19, wherein the additional multimedia data comprises advertisement multimedia data.

23. The computer program product of claim 17, further comprising instructions that cause the processor to:
determine availability of the representations using data of the manifest file; and
determine coding characteristics, display characteristics, and bitrates of the representations from the manifest file,
wherein the instructions that cause the processor to select one of a plurality of representations comprise instructions that cause the processor to select the representation based on the coding characteristics of the representation, the display characteristics of the representation, and the bitrate of the representation.

24. The computer program product of claim 23, further comprising instructions that cause the processor to:
determine coding capabilities of a client device; and
determine rendering capabilities of the client device,
wherein the instructions that cause the processor to select one of a plurality of representations comprises instructions that cause the processor to select the representation such that the coding capabilities of the client device satisfy the coding characteristics of the representation and such that the rendering capabilities of the client device satisfy the display characteristics of the representation.

25. The computer program product of claim 17, further comprising instructions that cause the processor to determine availability of the sources based on information received from the sources, wherein the instructions that cause the processor to select one of the sources comprise instructions that cause the processor to select one of the available sources.

* * * * *